US010097992B2

(12) United States Patent
Sivavakeesar (10) Patent No.: US 10,097,992 B2
(45) Date of Patent: Oct. 9, 2018

(54) COMMUNICATIONS SYSTEM (71) Applicant: NEC Corporation, Minato-ku, Tokyo (JP)

(72) Inventor: Sivapathalingham Sivavakeesar, Milton Keynes (GB)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/777,904

(22) PCT Filed: Mar. 28, 2014

(86) PCT No.: PCT/JP2014/059911
§ 371 (c)(1),
(2) Date: Sep. 17, 2015

(87) PCT Pub. No.: WO2014/163172
PCT Pub. Date: Oct. 9, 2014

(65) Prior Publication Data
US 2016/0088470 A1    Mar. 24, 2016

(30) Foreign Application Priority Data

Apr. 5, 2013  (GB) .................................. 1306203.9

(51) Int. Cl.
H04W 8/26       (2009.01)
H04W 48/16      (2009.01)
(Continued)

(52) U.S. Cl.
CPC ............. *H04W 8/26* (2013.01); *H04W 48/16* (2013.01); *H04W 60/00* (2013.01); *H04W 80/06* (2013.01);
(Continued)

(58) Field of Classification Search
CPC ..... H04W 88/16; H04W 92/20; H04W 24/02; H04W 36/0033; H04W 36/0061;
(Continued)

(56) References Cited

U.S. PATENT DOCUMENTS

2009/0207855 A1* 8/2009 Watanabe ............... H04L 69/22
370/466
2011/0141972 A1   6/2011 Oh et al.
(Continued)

FOREIGN PATENT DOCUMENTS

CN    102256383 A    11/2011
CN    102316604 A    1/2012
(Continued)

OTHER PUBLICATIONS

U.S. Appl. No. 61/721,745, filed Nov. 2, 2012.*
(Continued)

*Primary Examiner* — Daniel Lai (57) ABSTRACT

A communication system is disclosed comprising a gateway, a number of base stations, and a mobile device. The gateway holds information mapping address data for each base station to information identifying a respective cell operated by that base station. A base station obtains information identifying a cell operated by a neighbor base station and provides this information to the gateway. The gateway obtains from the information held address data for the neighbor base station based on the information identifying the cell operated by the neighbor base station. The gateway generates and sends a message including address data to the base station. The base station receives the message and establishes a connection with the neighbor base station using the address data.

26 Claims, 6 Drawing Sheets

(51) Int. Cl.

| | | |
|---|---|---|
| H04W 60/00 | (2009.01) | |
| H04W 84/04 | (2009.01) | |
| H04W 88/16 | (2009.01) | |
| H04W 92/20 | (2009.01) | |
| H04W 80/06 | (2009.01) | |

(52) U.S. Cl.
CPC ........ *H04W 84/042* (2013.01); *H04W 84/045* (2013.01); *H04W 88/16* (2013.01); *H04W 92/20* (2013.01)

(58) Field of Classification Search
CPC ....... H04W 88/08; H04W 8/26; H04W 84/18; H04W 88/182; H04W 48/16; H04W 60/00; H04W 84/042; H04W 80/06; H04W 84/045

See application file for complete search history.

(56) References Cited

U.S. PATENT DOCUMENTS

| | | | |
|---|---|---|---|
| 2011/0274086 A1 | 11/2011 | Xu | |
| 2012/0100860 A1 | 4/2012 | Lei et al. | |
| 2012/0178416 A1* | 7/2012 | Miklos | H04L 29/12066 455/410 |
| 2013/0137434 A1* | 5/2013 | Godin | H04W 8/24 455/436 |
| 2013/0281097 A1 | 10/2013 | Jung | |
| 2014/0126562 A1* | 5/2014 | Gunnarsson | H04W 92/20 370/338 |
| 2014/0140334 A1* | 5/2014 | Jeong | H04W 8/082 370/338 |
| 2014/0321447 A1* | 10/2014 | Ozturk | H04W 48/16 370/338 |
| 2015/0146619 A1* | 5/2015 | Xu | H04W 92/20 370/328 |
| 2015/0215774 A1* | 7/2015 | Huang | H04W 76/10 455/422.1 |

FOREIGN PATENT DOCUMENTS

| | | | | |
|---|---|---|---|---|
| KR | 2011-0068018 A | 6/2011 | | |
| KR | 2012-0079875 A | 7/2012 | | |
| WO | 2012/106884 A1 | 8/2012 | | |
| WO | 2012/148217 A2 | 11/2012 | | |
| WO | WO 2013189443 A2 * | 12/2013 | ........... | H04L 61/103 |

OTHER PUBLICATIONS

"Issues on X2-GW deployment", ZTE, R3-130196, 3GPP TSG-RAN3 Meeting #79, Malta, Malta, Jan. 28-Feb. 1, 2013, Cited in KROA.

Korean Office Action for KR Application No. 2015-7031279 dated Apr. 21, 2016 with English Translation.

3rd Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP TS 36.300 V11.5.0, Apr. 2013. Cited in the Specification.

ZTE: "Issues on X2-GW deployment", 3GPP Draft; R3-130571, 3rd Generation Partnership Project (3GPP), Mobile Competence Centre; 650, Route Des Lucioles; F-06921 Sophia-Antipolis Cedex; France, vol. RAN WG3, No. Chicago, USA; 20130415-20130419, Apr. 3, 2013 (Apr. 3, 2013), XP050700448, Retrieved from the Internet: URL:http://www.3gpp.org/ftp/tsg_ran/WG3_lu/TSGR3_79bis/Docs/, cited in ISR.

Nokia Siemens Networks: "X2-Gateway—Further details on the way for", 3GPP Draft; R3-122183 X2-GW, 3rd Generation Partnership Project (3GPP), Mobile Competence Centre; 650, Route Des Lucioles; F-06921 Sophia-Antipolis Cedex; France, vol. RAN WG3, Sep. 28, 2012 (Sep. 28, 2012), XP050669984, Retrieved from the Internet: URL:http://www.3gpp.org/ftp/tsg_ran/WG3_lu/TSGR3_77bis/Docs/, cited in ISR.

Alcatel-Lucent: "Way Forward on IP address discovery and X2 Setup", 3GPP Draft; R3-130381 Proxywayfrwdsetup, 3rd Generation Partnership Project (3GPP), Mobile Competence Centre; 650, Route Des Lucioles; F-06921 Sophia-Antipolis Cedex; France, vol. RAN WG3, No. Malta; Jan. 28, 2013-Feb. 1, 2013, Feb. 4, 2013 (Feb. 4, 2013), XP050671228, Retrieved from the Internet: URL:http://www.3gpp.org/ftp/tsg_ran/WG3_lu/TSGR3_79/Docs/, cited in ISR.

International Search Report for PCT Application No. PCT/JP2014/059911, dated Jul. 15, 2014.

Japanese Office Action for JP Application No. 2015-546755 dated Sep. 21, 2016 with English Translation.

3GPP TSG-RAN3 Meeting #79, "X2 SETUP procedure between eNB and HeNB", R3-130194, Jan. 28-Feb. 1, 2013, Malta, Malta, Cited in EESR, 5 pages.

3GPP TS 36.413 V11.3.0 (Mar. 2013), "Technical Specification Group Radio Access Network; Evolved Universal Terrestrial Radio Access Network (E-UTRAN); S1 Application Protocol (S1AP) (Release 11)", Mar. 2013, Valbonne, France, Cited in EESR, 274 pages.

Extended European Search Report for EP Application No. EP14717880.0 dated Oct. 24, 2017.

Chinese Office Action for JP Application No. 201480019708.X dated Jan. 19, 2018 with English Translation.

NEC, "TNL Address Discovery of Peer Nodes by an eNB and a HeNB", 3GPP TSG-RAN3 Meeting #79, Jan. 28 to Feb. 1, 2013, R3-130131, St Julian's, Malta, cited in JPOA.

Mitsubishi Electric, "Full and Routing X2 Proxy Options", 3GPP TSG RAN WG3 Meeting #79, Jan. 28 to Feb. 1, 2013, R3-130280, Malta, cited in JPOA.

3rd Generation Partnership Project, Technical Specification Group Radio Access Network; Evolved Universal Terrestrial Radio Access Network (E-UTRAN); X2 application protocol (X2AP) (Release 11), Mar. 2013, pp. 21-22, 38-39, 58-59, 62-63, 65,TS 36.423, V11.4.0, Sophia Antipolis, cited in JPOA.

Qualcomm Incorporated, "X2 setup procedure via X2-GW", 3GPP TSG-RAN WG3#79, Jan. 28 to Feb. 1, 2013, R3-130216, Malta, cited in JPOA.

Japanese Office Action for JP Application No. 2015-546755 dated May 23, 2018 with English Translation.

3GPP, "LTE; Evolved Universal Terrestrial Radio Access (E-UTRA) and Evolved Universal Terrestrial Radio Access Network (E-UTRAN); Overall description; Stage 2 (3GPP TS 36.300 version 10.9.0 Release 10)", ETSI TS 136 300, V10.9.0, Feb. 2013, total 210 pages.

Communication dated Jul. 31, 2018 from the Korean Intellectual Property Office in counterpart Application No. 2015-7031279.

* cited by examiner

COMMUNICATIONS SYSTEM

TECHNICAL FIELD

The present invention relates to a communications system and to components thereof for providing communication services to mobile or fixed communication devices. The invention has particular, but not exclusive, relevance to the discovery of transport network layer (TNL) addresses used by base stations in Long Term Evolution (LTE) Advanced systems as currently defined in associated 3rd Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

In order to provide seamless connectivity for the mobile devices, the base stations are configured with a list of their neighbour base stations so that the mobile devices can be handed over to one of the cells operated by other base stations when necessary (e.g. due to mobility of the mobile devices and/or changes in signal conditions and/or load balancing, etc). Therefore, each base station is required to store information relating to its neighbours including, inter alia, identifiers of the cells operated by each (known) neighbour base station, a unique identifier (e.g. eNB Id) associated with each neighbour base station, and a respective transport network layer (TNL) address associated with each neighbour base station. The TNL address facilitates communication between base stations via a so-called X2 interface, which is provided between each neighbour base station pair. The X2 interface uses the Stream Control Transmission Protocol (SCTP) to transmit data between the base stations.

Each base station can obtain the TNL address associated with another base station by following a so-called TNL Address Discovery procedure specified in section 22.3.6 of 3GPP TS 36.300, the contents of which are incorporated herein by reference. In summary, whenever a particular base station discovers a 'candidate' neighbour base station, it can request the so-called Mobility Management Entity (MME) in the core network to transfer configuration information between the two base stations via an S1 interface (which is provided between each base station and the core network). This procedure needs to be followed whenever there is a change in the configuration of one of the base stations and/or whenever a base station or a cell is added to (or removed from) the network to prevent handover problems for the mobile devices (e.g. incorrect selection of a handover target cell, which might result in loss of connection) in the vicinity of such cells. Since conventional (macro) base stations operate in an always-on mode and their configuration does not change often, this procedure does not cause unnecessary load on the core network elements and the S1 interface between the eNBs and the MME.

The 3GPP standards body has adopted an official architecture and defined standards for home base stations ('HNB'). Where a home base station is operating in accordance with the LTE standards, the home base station is sometimes referred to as a HeNB. A similar architecture is also applied in the WiMAX network. In this case, the home base station is commonly referred to as a femto cell. For simplicity, the present application will use the term HeNB to refer to any such home base station and will use the term eNB generically to refer to other base stations (such as the base station for the macro cell in which a HeNB operates). The HeNB can provide radio coverage (for example, 3G/4G/WiMAX) via one of more cells within a home, small and medium enterprise environment, and/or in public places (such as shopping malls and the like). The HeNB connects to the core network via a suitable public network (for example via an ADSL link to the Internet) or operator network and in the case of the 3GPP standards, via a so called small cell gateway (e.g. including the functionality of a so called HeNB-GW) which typically aggregates traffic from several HeNBs.

Network operators are facing a number of challenges due to HeNB deployment. For example, the HeNBs are typically under the operational control of a customer rather than the network operator. Unlike eNBs, the home base stations may power on and off frequently (e.g. gracefully for energy saving reasons and/or abruptly for any other reasons) causing frequent configuration changes in the neighbouring (home) base stations (i.e. to add/remove the cell(s) operated by these home base stations and/or to update the corresponding X2 connections). In a worst case scenario, after a power ON/Off cycle, the TNL Address of a HeNB may change (because the address assignment might be the responsibility of another provider, e.g. an internet service provider, ISP). Hence, e.g. in the morning/evening when it becomes active in a typical home environment, every HeNB triggers a TNL Address Discovery process on discovering each of its neighbours, which are most likely the same neighbours as before. Although each HeNB discovers a small number of neighbours only, on a national level it can be in the order of millions, depending on the number of households operating their own HeNB.

Another challenge resulting from the high number of HeNBs is that each base station (i.e. eNB/HeNB) needs to maintain a large number of X2 connections (i.e. one with each of its neighbour eNBs/HeNBs). In order to reduce the number of X2 connections to be maintained in an eNB, a so-called X2-Gateway (X2-GW) entity (which may form part of or may be separate from the small cell gateway) can be provided between the eNBs and a predetermined group of HeNBs. In particular, the X2-GW makes it possible for an eNB to establish a single X2 connection with the X2-GW for each of a plurality of HeNBs that are also connected to that X2-GW. In this case, the number of HeNBs currently deployed (or being turned on) in the network can change without requiring re-configuration of the X2 connection between the eNB and the X2-GW—thus reducing the amount of signalling with the MME. Whenever a HeNB is turned on and/or reconfigured, it contacts its associated X2-GW which can provide access to any eNB also connected to this X2-GW without requiring contacting the MME (as would be the case for establishing a direct X2 connection to that eNB). There are two types of X2-GWs, the first one is a 'full-poxy' gateway (one that terminates non-UE traffic and stores X2 associations between (H)eNB addresses) and the other one is a 'routing-proxy' gateway (one that only routes signalling messages between two endpoints, based on addresses indicated in the messages themselves, but does not maintain any association between them).

Signalling traffic to the CN needs to be minimised in order to ensure enough bandwidth and processing time availability for other important traffic. However, even when an X2-GW is used, the TNL Address Discovery cannot be avoided completely for at least the following reasons:

Before X2 Setup, there needs to be an SCTP Association between two peers, i.e. a source (H)eNB and a target (H)eNB.

For SCTP Association, a source (and/or the X2-GW acting as a proxy) has to know the TNL Address of the target.

A source (H)eNB currently employs the TNL Address discovery procedure to get the TNL Address of the target (H)eNB.

This requires a source to send an 'eNB Configuration Transfer' message on an S1-MME interface and wait for a reply.

Traffic to an MME means signalling traffic to the core network, which can cause saturation if uncontrolled given the sheer number of HeNBs that may be provided in the network and their tendency to employ a power on/off cycle.

Furthermore, with the introduction of the X2-GW, there is a need to discover two TNL addresses instead of one, i.e. the address of the peer (H)eNB and also of the X2-GW.

It can be seen therefore, that in current systems there can be a large signalling load towards core network entities that is associated with frequent configuration changes of HeNBs and with TNL address discovery procedures.

Although for efficiency of understanding for those of skill in the art, the invention will be described in detail in the context of an LTE system, the principles of the invention can be applied to other systems (such as WiMAX) in which (home) base stations communicate via a signalling gateway with the corresponding elements of the system changed as required.

SUMMARY OF THE INVENTION

Accordingly, preferred embodiments of the present invention aim to provide methods and apparatus which overcome or at least alleviate the above issues.

In one aspect, the present invention provides a system comprising a gateway apparatus, a plurality of base stations, and a mobile device operable to communicate with at least one of said plurality of base stations. The gateway apparatus comprises: means for holding information mapping address data for each of said plurality of base stations to information identifying a respective cell operated by that base station of said plurality of base stations. The at least one base station comprises: means for obtaining information identifying a cell operated by a neighbour base station; and means for providing said information to said gateway apparatus. The gateway apparatus further comprises: means for receiving from a base station said information identifying said cell operated by said neighbour base station; means for obtaining from said information held address data for said neighbour base station operating said cell based on said information identifying said cell operated by said neighbour base station; means for generating a message comprising said address data; and means for sending said at least one base station said message comprising said address data. The at least one base station further comprises: means for receiving from said gateway apparatus, in response to said information provided to said gateway apparatus, the message generated by said gateway apparatus, the message comprising address data for said neighbour base station operating said cell; and means for establishing a connection, with said neighbour base station using said address data.

The invention also provides a gateway apparatus in a communication system comprising a plurality of base stations, the gateway apparatus comprising: means for holding information mapping address data for each of said plurality of base stations to information identifying a respective cell operated by that base station of said plurality of base stations; means for receiving from a base station information identifying a cell operated by a neighbour base station; means for obtaining from said information held address data for said neighbour base station operating said cell based on said information identifying said cell operated by said neighbour base station; means for generating a message comprising said address data; and means for sending said at least one base station said message comprising said address data.

The information held may comprise data identifying a respective relationship between address data for each of said plurality of base stations and at least one respective cell operated by each of said plurality of base stations.

The gateway apparatus may further comprise means for creating an association with at least one of said plurality of base stations using a first communication protocol. The gateway apparatus may further comprise means for registering said at least one base station using a second communication protocol over said a first communication protocol. In this case, the first communication protocol may be a Stream Control Transmission Protocol (SCTP) and said second communication protocol may be an X2 protocol.

The receiving means may be operable to receive from said base station at least one message. In this case, the at least one message may comprise a registration request (e.g. an 'X2 Registration Request') or a neighbourhood notification message (e.g. an 'X2 Neighbour Notify' message). The information identifying said cell operated by said neighbour base station may be included in at least one information element in the at least one message. The information identifying said cell may comprise an E-UTRAN Cell Global Identifier (ECGI) and said address data may comprise a Transport Network Layer (TNL) address.

The generating means may be operable to generate a message indicative of a direct connection or an indirect connection via said gateway or via a different gateway to be established between said base station and said neighbour base station. The obtaining means, if address data for said neighbour base station operating said cell is not held, may be operable to obtain an indication to assist said base station to obtain said address data using a fall-back mechanism, for example, an Automated Neighbour Relation (ANR) mechanism.

The gateway apparatus may further comprise means for maintaining the information held.

The gateway apparatus may comprise an X2 protocol gateway.

In another aspect, the invention provides a base station for use in a communication system comprising a plurality of base stations and a gateway apparatus, the base station comprising: means for obtaining information identifying a cell operated by a neighbour base station; means for providing said information to said gateway apparatus; means for receiving from said gateway apparatus, in response to said information provided to said gateway apparatus, a message generated by said gateway apparatus, the message comprising address data for said neighbour base station operating said cell; and means for establishing a connection, with said neighbour base station using said address data.

The establishing means may be operable to establish said connection without contacting a core network.

The obtaining means may be operable to discover said cell operated by said neighbour base station and wherein said providing means is operable to provide said notification in response to said obtaining means discovering said cell operated by said neighbour base station. The obtaining means may also be operable to discover said cell operated by said neighbour base station by communicating with a mobile device. For example, the obtaining means may be operable to discover said cell operated by said neighbour base station using an Automatic Neighbour Relation (ANR) functionality.

The providing means may be operable to send the gateway apparatus at least one message. In this case, the at least one message may comprise a registration request (e.g. an 'X2 Registration Request') or a neighbourhood notification message (e.g. an 'X2 Neighbour Notify' message). The information identifying said cell operated by said neighbour base station may be included in at least one information element in said at least one message. The information identifying said cell may comprise an E-UTRAN Cell Global Identifier (ECGI) and said address data may comprise a Transport Network Layer (TNL) address.

The base station may further comprise means for creating an association with said gateway apparatus using a first communication protocol. The base station may further comprise means for registering with said gateway apparatus using a second communication protocol over said a first communication protocol. In this case, the first communication protocol may be a Stream Control Transmission Protocol (SCTP) and the second communication protocol may be an X2 protocol.

The registering means may be operable to register said base station with a plurality of gateway apparatus. In this case, the providing means may be operable to provide said information to said plurality of gateway apparatus and said establishing means may be operable to establish a connection with said neighbour base station using said address data via the gateway apparatus that provided said address data. The registering means may be operable to provide to said gateway apparatus a Radio Network Layer (RNL) identity of the base station and a Transport Network Layer (TNL) address of the base station. The address data for the neighbour base station may also comprise a TNL address.

The base station may be a macro base station or a home base station operating in accordance with the Long Term Evolution (LTE) set of standards.

The base station may further comprise means for identifying, from said message generated by said gateway apparatus, whether to establishing said connection with said neighbour base station directly or indirectly via said gateway apparatus or via a different gateway apparatus. The message received from said gateway apparatus may comprise an indication to assist said base station to obtain said address data using a fall-back mechanism, for example, an Automated Neighbour Relation (ANR) mechanism.

In another aspect, the invention provides a gateway apparatus in a communication system comprising a plurality of base stations, the gateway apparatus comprising a memory, a processor, and transceiver circuitry, wherein: said memory is configured to hold information mapping address data for each of said plurality of base stations to information identifying a respective cell operated by that base station of said plurality of base stations; said transceiver circuitry is configured to: receive from a base station information identifying a cell operated by a neighbour base station; said processor is configured to: i) obtain from said information held in said memory address data for said neighbour base station operating said cell based on said information identifying said cell operated by said neighbour base station; and ii) generate a message comprising said address data; and wherein said transceiver circuitry is configured to send said at least one base station said message comprising said address data.

In yet another aspect, the invention provides a base station for use in a communication system comprising a plurality of base stations and a gateway apparatus, the base station comprising a processor and transceiver circuitry, wherein: said processor is configured to obtain information identifying a cell operated by a neighbour base station; said transceiver circuitry is configured to i) provide said information to said gateway apparatus; ii) receive from said gateway apparatus, in response to said information provided to said gateway apparatus, a message generated by said gateway apparatus, the message comprising address data for said neighbour base station operating said cell; and iii) establish a connection with said neighbour base station using said address data.

The invention also provides a mobile device for use with the above communication system.

In another aspect, the invention provides a method performed by a gateway apparatus, the method comprising: holding information mapping address data for each of said plurality of base stations to information identifying a respective cell operated by each of said plurality of base stations; receiving from a base station information identifying a cell operated by a neighbour base station; obtaining from said information held address data for said neighbour base station operating said cell based on said information identifying said cell operated by said neighbour base station; generating a message comprising said address data; and sending said at least one base station said message comprising said address data.

In yet another aspect, the invention provides a method performed by a base station in a communication system comprising a plurality of base stations and a gateway apparatus, the method comprising: obtaining information identifying a cell operated by a neighbour base station; providing said information to said gateway apparatus; receiving from said gateway apparatus, in response to said notification, a message generated by said gateway apparatus, the message comprising address data for said neighbour base station operating said cell; and establishing a connection, with said neighbour base station using said address data.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Embodiments of the invention will now be described, by way of example, with reference to the accompanying drawings in which.

DETAILED DESCRIPTION OF THE EXEMPLARY EMBODIMENTS

Overview

Figure 1:
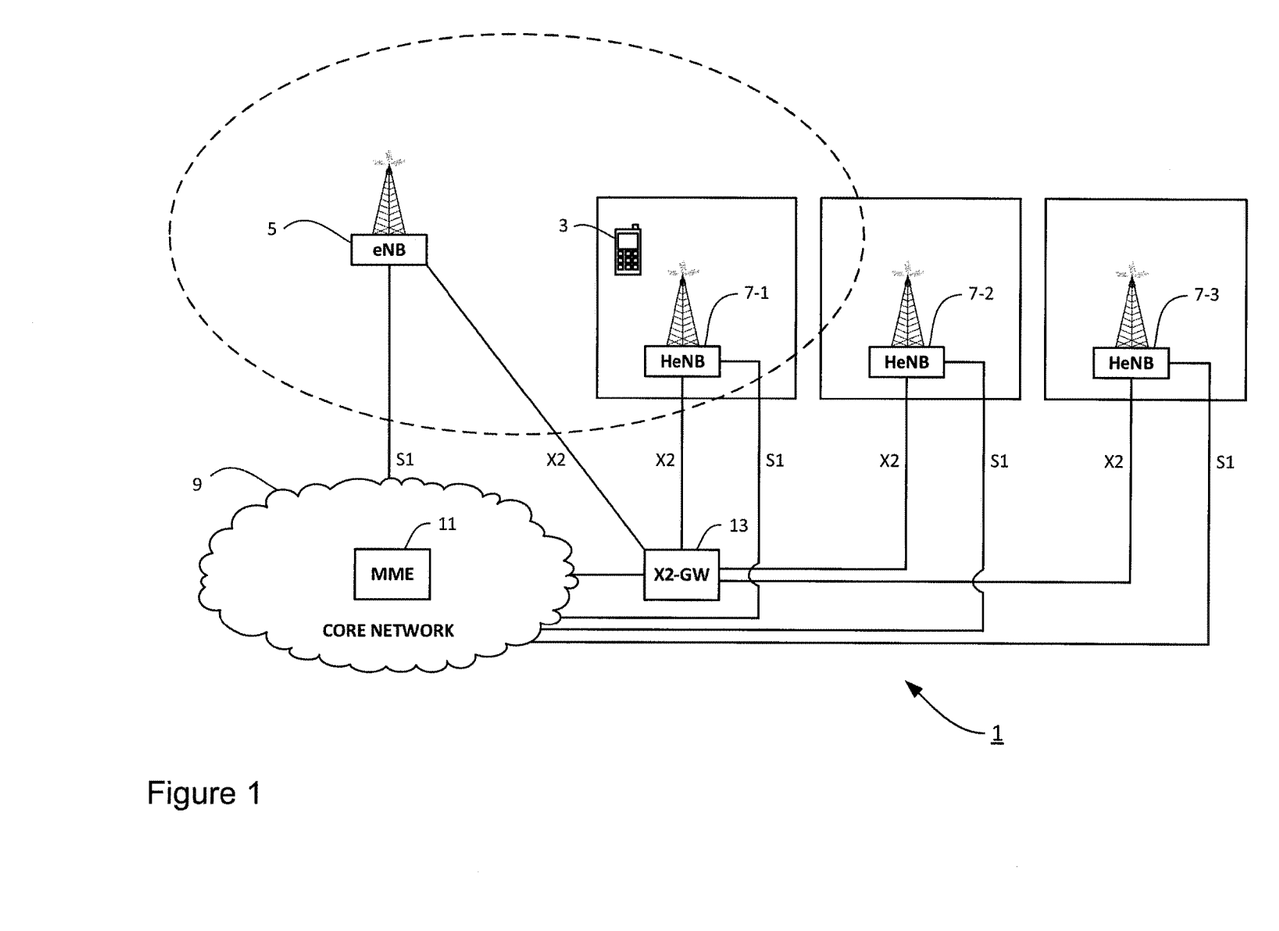
FIG. 1 schematically illustrates a mobile telecommunication system of a type to which the invention is applicable.

FIG. 1 schematically illustrates a mobile (cellular) telecommunication system 1 including a mobile telephone 3 (or other compatible user equipment) served via a macro cell of a base station 5 (eNB) and/or home cells of a plurality of home base stations 7 (HeNBs). The telecommunication system 1 also comprises a core network 9.

Each of the base station 5 and the home base stations 7 is connected to the core network 9 via an S1 interface. The core network 9 comprises, amongst other things, a mobility management entity (MME) 11. The base stations 5 and 7 are also connected to each other via a so-called X2 interface, which is usually provided directly between each pairs of (home) base stations. However, in this embodiment, an X2 gateway (X2-GW) 13 entity is provided between the base station 5 and the home base stations 7. The X2-GW 13 is also connected to the core network 9, e.g. via an interface towards the MME 11.

As will be understood by those skilled in the art, each eNB 5/HeNB 7 operates one or more cells in which communications can be made between the eNB 5/HeNB 7 and the mobile telephone 3. A user of the mobile telephone 3 can communicate with other users and/or remote servers via the eNB 5/HeNB 7 and the core network 9. As those skilled in the art will appreciate, whilst one mobile telephone 3, one base station 5, and three home base stations 7-1, 7-2, and 7-3 are shown in FIG. 1 for illustration purposes, the system, when implemented, will typically include other mobile telephones and (home) base stations.

In this embodiment, the X2-GW 13 is configured to maintain an SCTP association with each base station (i.e. eNB 5 and HeNB 7) in its domain using an associated TNL address for each base station 5 and 7. For example, the SCTP association with the X2-GW 13 can be initiated by a eNB 5/HeNB 7 based on preconfigured TNL address information (pertaining to the X2-GW 13) stored in a non-volatile memory. Using the SCTP association between them, each active (H)eNB registers with the X2-GW 13, using its own radio network layer identifier (RNL ID). Beneficially, each HeNB 7 stores the address of the X2-GW 13 in a non-volatile memory and therefore it is able to register with the X2-GW 13 as part of its initialisation procedures following the HeNB 7 powering on. Similarly, the eNB 5 is also able to register with the X2-GW 13 at least initially (since a macro base station is not expected to power off and on again during the course of its normal operation). The X2-GW 13 maintains a mapping table indicating relationships between RNL identities and TNL addresses associated with each base station registering with the X2-GW 13.

If the X2-GW 13 receives (e.g. during registration or in a subsequent communication) indication of a newly discovered neighbour (e.g. an identifier of a cell of the neighbour) from any of the registered base stations, it looks up in its mapping table the corresponding entries for the neighbours and retrieves their associated TNL addresses (if available). If an associated TNL address can be found, the X2-GW 13 replies to the indication and includes in the reply the respective TNL address of each indicated neighbour.

Beneficially, using the TNL address obtained from the X2-GW 13, the eNB 5 and the HeNBs 7 are able to establish an X2 connection with each other without requiring any communication with the core network 9 to discover TNL addresses.

On the other hand, if an associated TNL address cannot be found in its mapping table, the X2-GW 13 replies by indicating to the base station that has discovered this neighbour that no corresponding TNL Address can be found. Beneficially, such indication makes it possible for the base station to use conventional TNL discovery mechanism (i.e. involving the MME 9) or to obtain the TNL address from a different X2-GW. This situation may happen, for example, when the discovered neighbour satisfies at least one of the following conditions: i) the neighbour is a pre-Rel-12 HeNB and hence it is not compatible with the X2-GW 13; ii) the neighbour is a Rel-12/post-Rel-12 HeNB that is not configured to work with any X2-GW; and iii) the neighbour is not configured to register with this X2-GW 13 (although it might be configured to register with a different X2-GW).

Base Station

Figure 2:
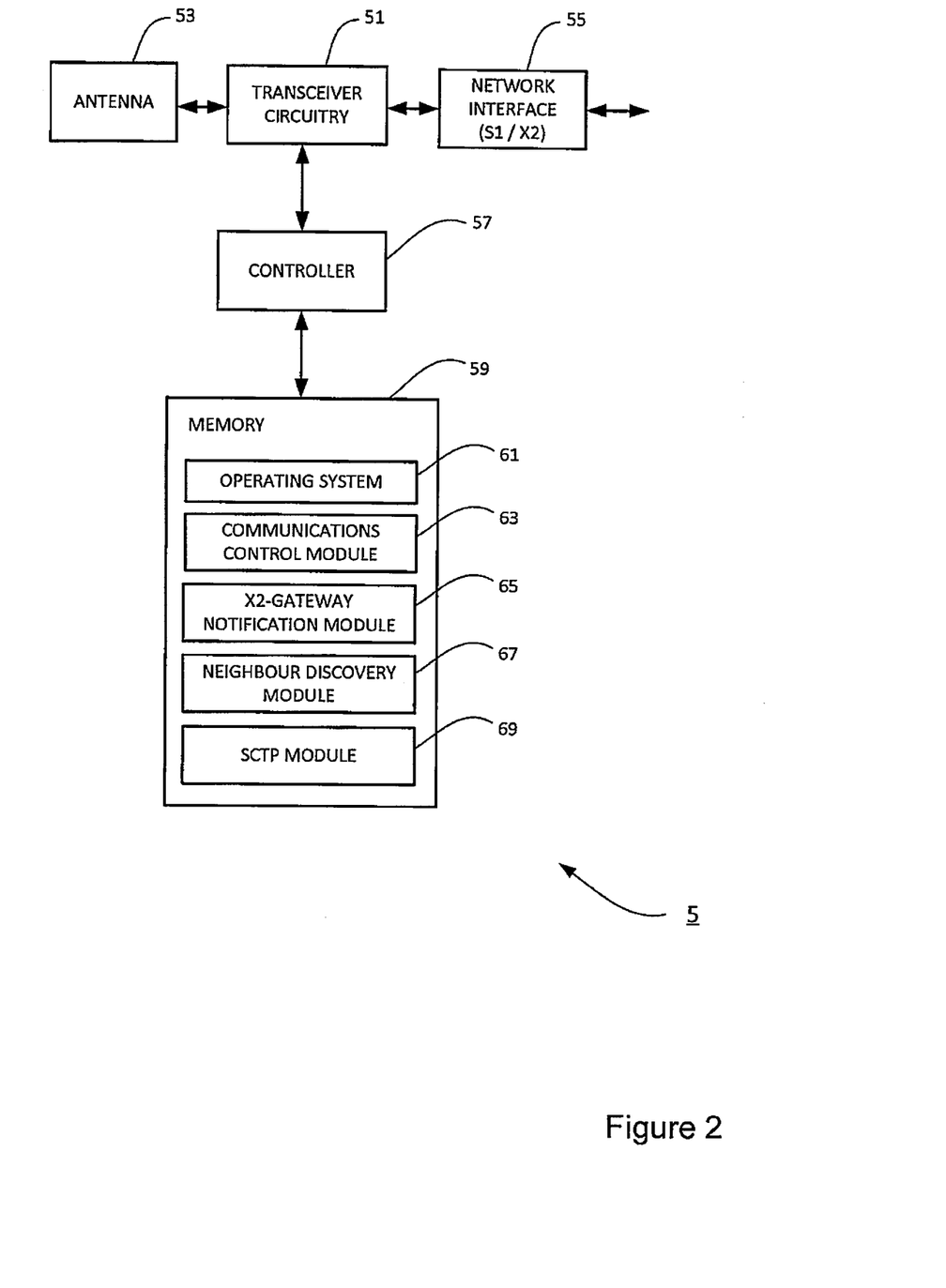
FIG. 2 is a block diagram illustrating the main components of the base station forming part of the system shown in FIG. 1.

FIG. 2 is a block diagram illustrating the main components of one of the base station (eNB) 5 shown in FIG. 1. As shown, the eNB 5 includes transceiver circuitry 51 which is operable to transmit signals to, and to receive signals from, the mobile telephone 3 via one or more antennae 53 and which is operable to transmit signals to and to receive signals from another base station 5, the HeNB 7, the X2-GW 13, and the MME 11 via a network interface 55. The operation of the transceiver circuitry 51 is controlled by a controller 57 in accordance with software stored in memory 59. The software includes, among other things, an operating system 61, a communications control module 63, an X2 gateway notification module 65, a neighbour discovery module 67 and an SCTP association module 69.

The communications control module 63 is operable to handle (e.g. generate, send and receive) control signals for controlling the connections between the base station 5 and other entities, such as the mobile telephone 3, other base stations, the mobility management entity 11, and/or the X2 gateway 13.

The X2 gateway notification module 65 is operable to inform the X2-GW 13 about any neighbour cells discovered by the neighbour discovery module 67. The X2 gateway notification module 65 is also operable to identify any discovered cells by an appropriate unique identifier, such as an E-UTRAN Cell Global Identifier (ECGI) for cells operating in accordance with the relevant 3GPP standards.

The neighbour discovery module 67 is operable to scan the base station's 5 neighbourhood (without transmitting any data) in order to discover neighbours in its vicinity. The neighbour discovery module 67 may also be operable to discover neighbours through other means, e.g. using its Automatic Neighbour Relation (ANR) functionality and/or a Network Monitor Mode (NMM) module. Whenever a neighbour is discovered the neighbour discovery module 67 is operable to notify the X2-GW 13 (associated with this eNB 5) using an appropriate X2 message indicating the ID of a discovered (H)eNB. The ID of the neighbour may be included in an appropriate X2 message together with the eNB's 5 own RNL ID.

The SCTP association module 69 is operable to create an SCTP communication link between the eNB 5 as a source and a peer entity as the target using the TNL address of the peer entity. The communication link may be created either directly with the target entity (e.g. another base station 5, a home base station 7, and/or an X2 gateway 13), or indirectly via another entity (e.g. via the X2-GW 13).

Home Base Station

Figure 3:
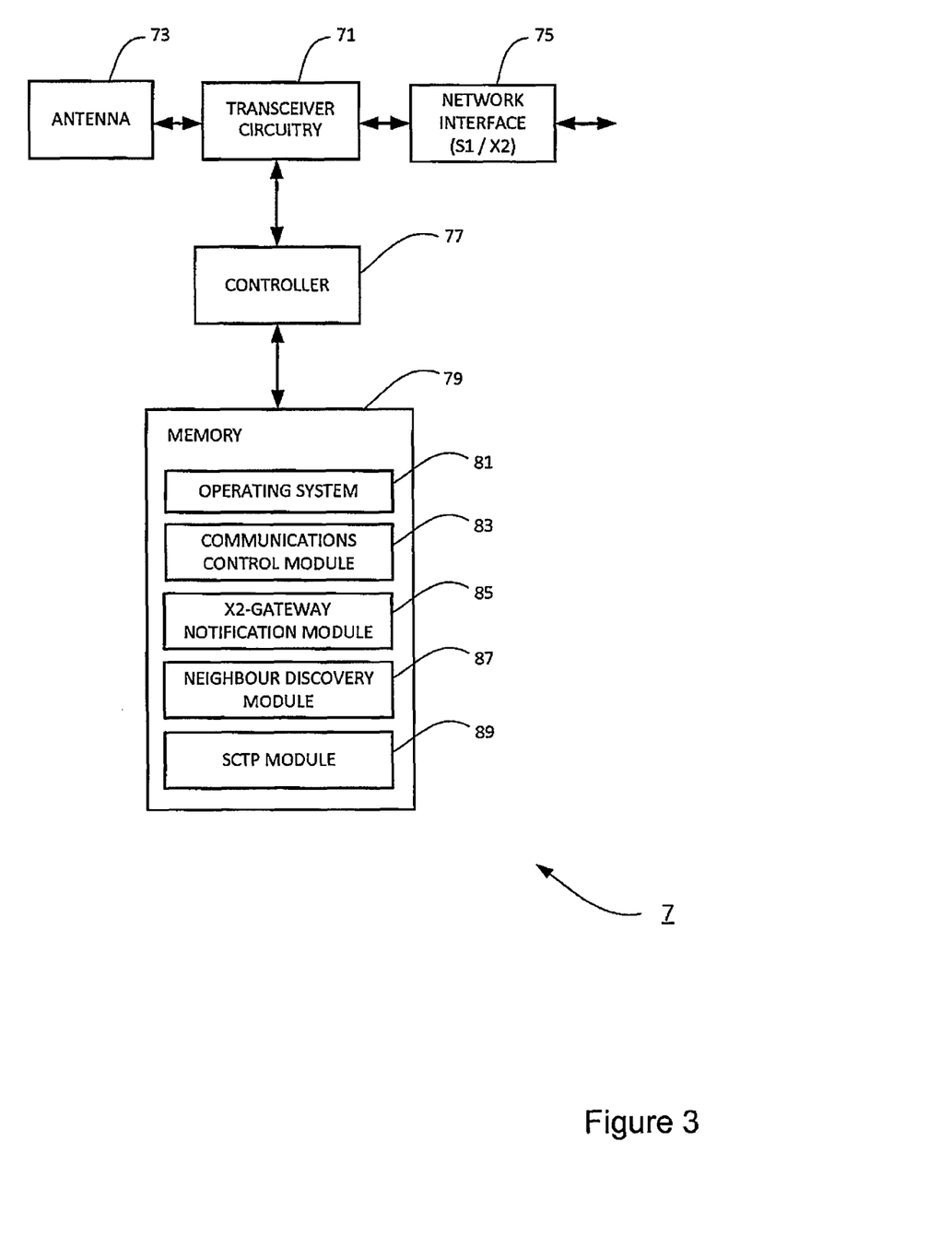
FIG. 3 is a block diagram illustrating the main components of the home base station forming part of the system shown in FIG. 1.

FIG. 3 is a block diagram illustrating the main components of one of the home base stations (HeNB) 7 shown in FIG. 1. As shown, the HeNB 7 includes transceiver circuitry 71 which is operable to transmit signals to, and to receive signals from, the mobile telephone 3 via one or more antennae 73 and which is operable to transmit signals to and to receive signals from the eNB 5, another HeNB 7, the X2-GW 13, and the MME 11 via a network interface 75. The operation of the transceiver circuitry 71 is controlled by a controller 77 in accordance with software stored in memory 79. The software includes, among other things, an operating system 81, a communications control module 83, an X2 gateway notification module 85, a neighbour discovery module 87, and an SCTP association module 89.

The communications control module 83 is operable to handle (e.g. generate, send and receive) control signals for controlling the connections between the home base station 7 and other entities, such as the mobile telephone 3, other base stations, the mobility management entity 11, and/or the X2 gateway 13.

The X2 gateway notification module 85 is operable to inform the X2-GW 13 about any neighbour cells discovered by the neighbour discovery module 87. The X2 gateway notification module 85 is also operable to identify any discovered cells by an appropriate unique identifier, such as an E-UTRAN Cell Global Identifier (ECGI) for cells operating in accordance with the relevant 3GPP standards.

The neighbour discovery module 87 is operable to scan the home base station's 7 neighbourhood (without transmitting any data) in order to discover neighbours in its vicinity. The neighbour discovery module 87 may also be operable to discover neighbours through other means, e.g. using ANR and/or NMM. Whenever a neighbour is discovered the neighbour discovery module 87 is operable to notify the X2-GW 13 (associated with this HeNB 7) using an appropriate X2 message indicating the ID of a discovered (H)eNB. The ID of the neighbour may be included in an appropriate X2 message together with the HeNB's 7 own RNL ID.

The SCTP association module 89 is operable to create an SCTP communication link between the HeNB 7 as a source and a peer entity as the target using the TNL address of the peer entity. The communication link may be created either directly with the target entity (e.g. a base station 5, another home base station 7, and/or an X2 gateway 13), or indirectly via another entity (e.g. via the X2-GW 13). The SCTP association module 89 is operable to create a default SCTP communication link with one or more predefined X2-GW(s) 13.

X2 Gateway

Figure 4:
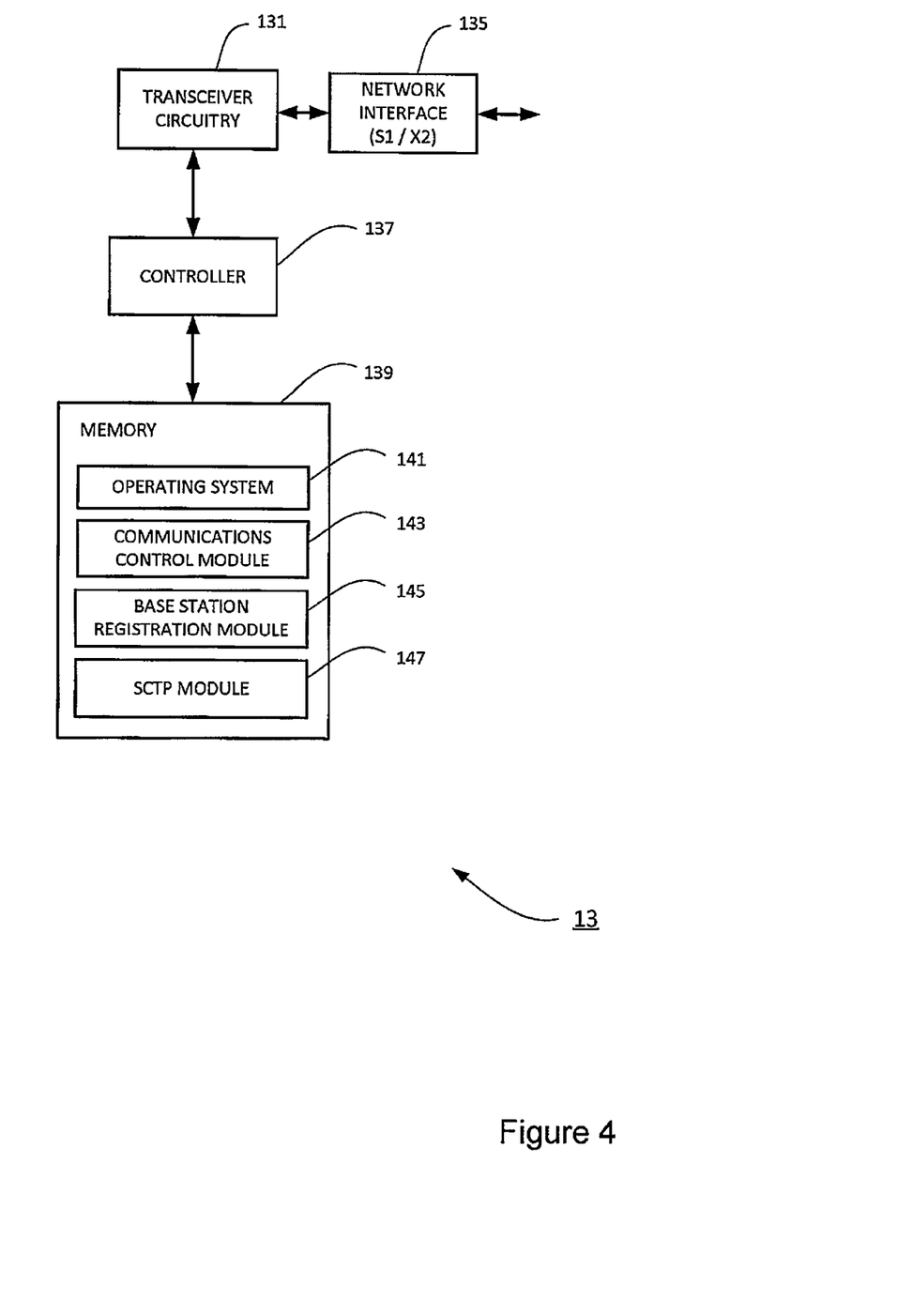
FIG. 4 is a block diagram illustrating the main components of the gateway forming part of the system shown in FIG. 1.

FIG. 4 is a block diagram illustrating the main components of the X2 gateway 13 shown in FIG. 1. As shown, the X2-GW 13 includes a transceiver circuitry 131 which is operable to transmit signals to, and to receive signals from, the eNB 5, the other HeNBs 7, and the MME 11 via a network interface 135. The operation of the transceiver circuitry 131 is controlled by a controller 137 in accordance with software stored in memory 139. The software includes, among other things, an operating system 141, a communications control module 143, a base station registration module 145, and an SCTP module 147.

The communications control module 143 is operable to handle (e.g. generate, send and receive) control signals for controlling the connections between the X2 gateway 13 and other entities, such as the base stations and/or the mobility management entity 11.

The base station registration module 145 is operable to register base stations (including eNBs 5 and HeNBs 7) that are currently powered on and have an SCTP association with the X2-GW 13 and to store and maintain a mapping table indicating relationships between RNL identities and TNL addresses associated with each base station registering with the X2-GW.

The SCTP module 147 is operable to communicate with other entities using the SCTP protocol. The SCTP module 147 is also operable to create an SCTP communication link between a peer entity as a source and the X2 gateway 13 as the target. The source may be either a base station 5 or a home base station 7.

In the above description, the base station 5, the home base station 7, and the X2 gateway 13 are described for ease of understanding as having a number of discrete modules (such as the communications control modules, the X2-GW notification modules, and the SCTP association modules, etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

A more detailed description will now be given (with reference to FIGS. 5 and 6) of establishing an X2 connection between peer (home) base stations in accordance with exemplary embodiments of the invention.

Figure 5:
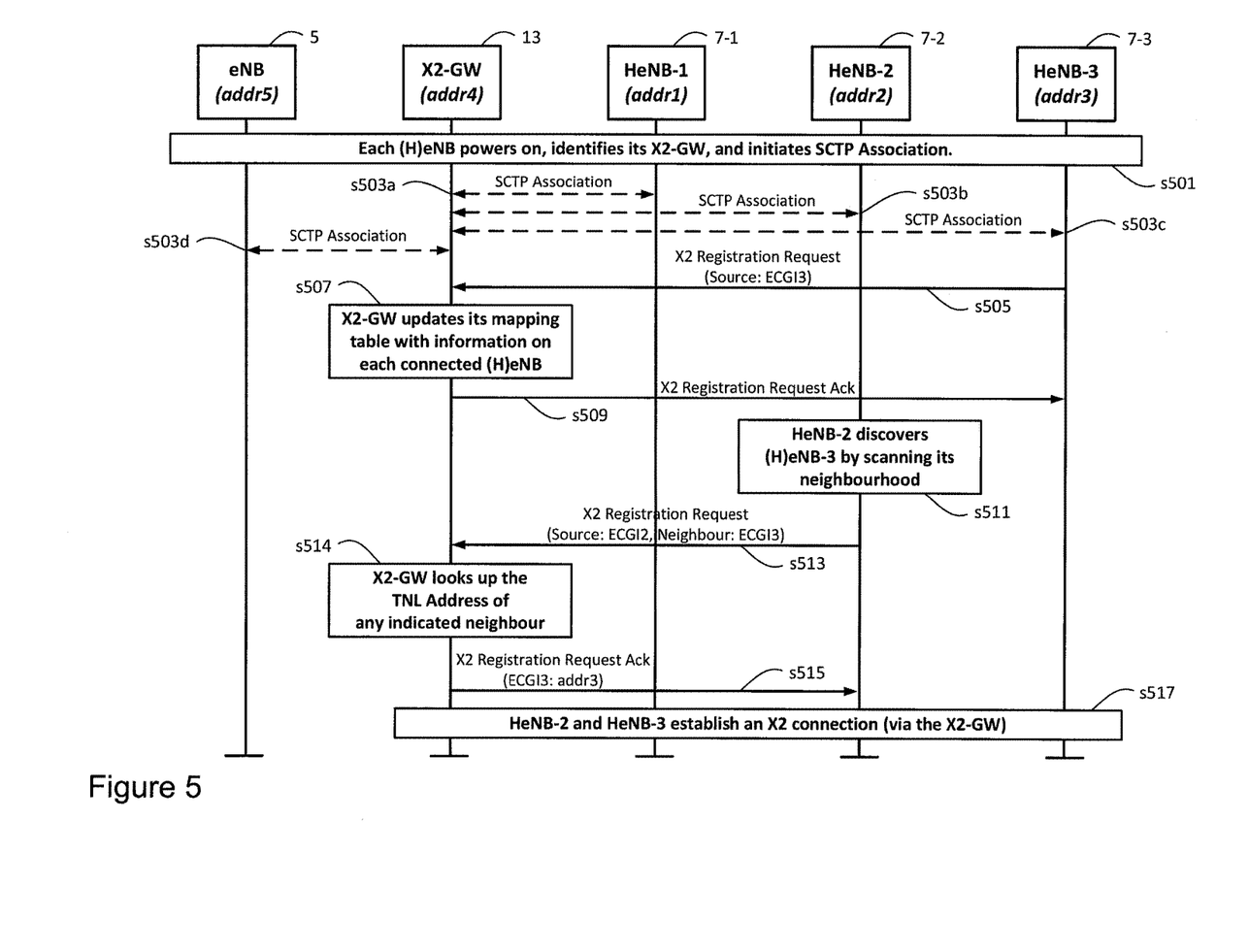
FIG. 5 is an exemplary timing diagram illustrating a method performed by components of the mobile telecommunication system of FIG. 1 whilst carrying out an embodiment of the invention.

FIG. 5 is an exemplary timing diagram illustrating a method performed by components of the mobile telecommunication system 1 of FIG. 1 whilst carrying out an embodiment of the invention.

In this case, it is assumed that each HeNB 7 is aware of the TNL address of at least its (default) X2-GW 13, which may be stored e.g. in the non-volatile memory 79 as part of the configuration data for the HeNB 7. Therefore, each HeNB 7 is configured to register (e.g. at X2-level) with one or more X2-GW(s) 13 as soon as it is switched on (or whenever its TNL address changes). In order to do so, the HeNB 7 may be configured with the TNL address of the X2-GW 13 for creating an SCTP association with the X2-GW and use this SCTP association to exchange X2-level signalling messages with the X2-GW 13. This way the X2-GW 13 is able to gather the respective TNL addresses and the associated RNL ID of every active HeNB 7 in its domain.

Similarly, it is assumed that each eNB 5 identifies any X2-GWs 13 in its domain and registers (e.g. at X2-level) with one or more X2-GW(s) 13 in its neighbourhood. For example, the eNB 5 may obtain the TNL address of an X2-GW 13 from the MME 11 from a message received in response to an 'eNB configuration transfer' message. The eNB 5 (e.g. via the MME 11) may also obtain the respective TNL addresses from an Operation and Maintenance (OAM) entity connected to the mobile telecommunication system 1.

Therefore, as indicated generally at S501 of FIG. 5, each eNB 5 and HeNB 7 identifies its X2-GW 13 as soon as it powers on (or whenever its configuration changes) and proceeds to initiate an SCTP association with the X2-GW 13. Steps S503a to S503d indicate the respective SCTP association procedures performed between each eNB 5/(H) eNB 7 and the X2-GW 13 (using their respective SCTP modules 67, 89, and 147). After this stage, the X2-GW will have established an SCTP communication link with each (H)eNB that is currently powered on and hence it is able to exchange X2 protocol messages (using the SCTP protocol) with any of them. After the SCTP association is complete, the sender of any X2 message (identified by its RNL ID) can be uniquely identified using the TNL address used for the corresponding SCTP association between the peers.

Next, in step S505, the third HeNB 7-3 (using its X2-GW registration module 85) generates and sends (via its transceiver circuitry 71) an appropriately formatted registration request, e.g. an 'X2 Registration Request' message, to register with the X2-GW 13. The HeNB 7-3 includes in this message its own ECGI that uniquely identifies the cell operated by this HeNB 7-3—in this case 'ECGI3'. This information may be included in e.g. a suitably formatted information element (IE), such as a 'Source IE'. If the HeNB 7-3 operates multiple cells, it includes each corresponding ECGI in this message using one or more suitably formatted information elements (i.e. one IE per ECGI or one IE for multiple/all ECGIs). Alternatively, the HeNB 7-3 may generate and send a separate 'X2 Registration Request' message to the X2-GW 13 for each ECGI or for a predetermined set of ECGIs associated with it.

Upon receipt of the registration request, the X2-GW 13 (using its HeNB registration module 145) updates its mapping table, in step S507, by including any information received in the request (e.g. ECGI(s), RNL ID, RNL address, TNL address, etc. associated with the HeNB 7-3 sending the request).

In particular, the X2-GW 13 is configured to perform the following actions upon receipt of a registration request:
1) Add a corresponding entry associated with the initiator (source) of the 'X2 Registration Request' message in its mapping table relating the initiator's RNL ID and TNL Address; and
2) If the 'X2 Registration Request' message contains information on any neighbour (e.g. any RNL ID pertaining to neighbours of the initiator), the X2-GW 13 checks its mapping table for corresponding entries and if it finds any, it will reply with the TNL address(es) of the indicated neighbours.

Next, in step S509, the X2-GW 13 (using its HeNB registration module 145) generates and sends (via its transceiver circuitry 131) an appropriately formatted response, e.g. an 'X2 Registration Request Ack' message, to confirm registration of the third HeNB 7-3 with the X2-GW 13. From this point on the third HeNB 7-3 is able to establish an X2 connection with the eNB 5 and the other HeNBs 7-1 and 7-2 via this X2-GW 13.

As indicated generally at S511, the second HeNB 7-2 discovers (using its neighbour discovery module 87) one or more cells operated by its new neighbour HeNB 7-3. In order to be able to establish an X2 connection with its newly discovered neighbour, the second HeNB 7-2 also generates and sends (using its X2-GW registration module 85 and transceiver circuitry 71) an appropriately formatted registration request, e.g. an 'X2 Registration Request' message, to register its cell(s) with the X2-GW 13. The HeNB 7-2 includes in this message (e.g. in a 'Source IE') its own ECGI(s) to uniquely identify the cell(s) operated by this HeNB 7-2—in this case 'ECGI2'. However, the HeNB 7-2 also includes in this message (e.g. in a 'Neighbour IE') any neighbour cell ECGI that has been discovered by this HeNB 7-2—in this case 'ECGI3' which identifies a cell operated by HeNB 7-3.

As indicated generally at step S514, upon receipt of the registration request from the second HeNB 7-2, the X2-GW 13 (using its HeNB registration module 145) looks up the TNL address associated with any indicated neighbour cell (as identified by the respective ECGI(s) in the 'Neighbour IE' of the received registration request). If an ECGI refers to a cell which has previously been included in the X2-GW's 13 mapping table (e.g. 'ECGI3' in step S507), the X2-GW 13 retrieves the TNL address of the HeNB operating that cell.

In this case, as shown in step S515, the X2-GW 13 generates and sends (e.g. using its HeNB registration module 145 and transceiver circuitry 131) an appropriately formatted response, e.g. an 'X2 Registration Request Ack' message, to confirm registration of the second HeNB 7-2 with the X2-GW 13 and to provide the TNL address associated with the HeNB 7-3 operating the neighbour cell (i.e. 'ECGI3') that was indicated in the preceding registration request.

Finally, as indicated generally at step S517, the second HeNB 7-2 and the third HeNB 7-3 are able to establish an X2 connection with each other using the TNL address (of HeNB 7-3) obtained from the X2-GW 13 (by HeNB 7-2) in the preceding step.

This embodiment provides a number of advantages over conventional TNL address discovery procedures involving the MME 11. In particular, the source HeNB 7 is able to notify (using the exemplary 'X2 Registration Request' message) the IDs of the neighbour cells it has found and the X2-GW 13 is able to reply straight-away with the neighbours' TNL Addresses (if included in its mapping table). This makes any source HeNB 7 able to determine whether a direct X2 connection or an X2 connection through the X2-GW 13 is possible without necessitating any traffic to the core network 9.

Figure 6:
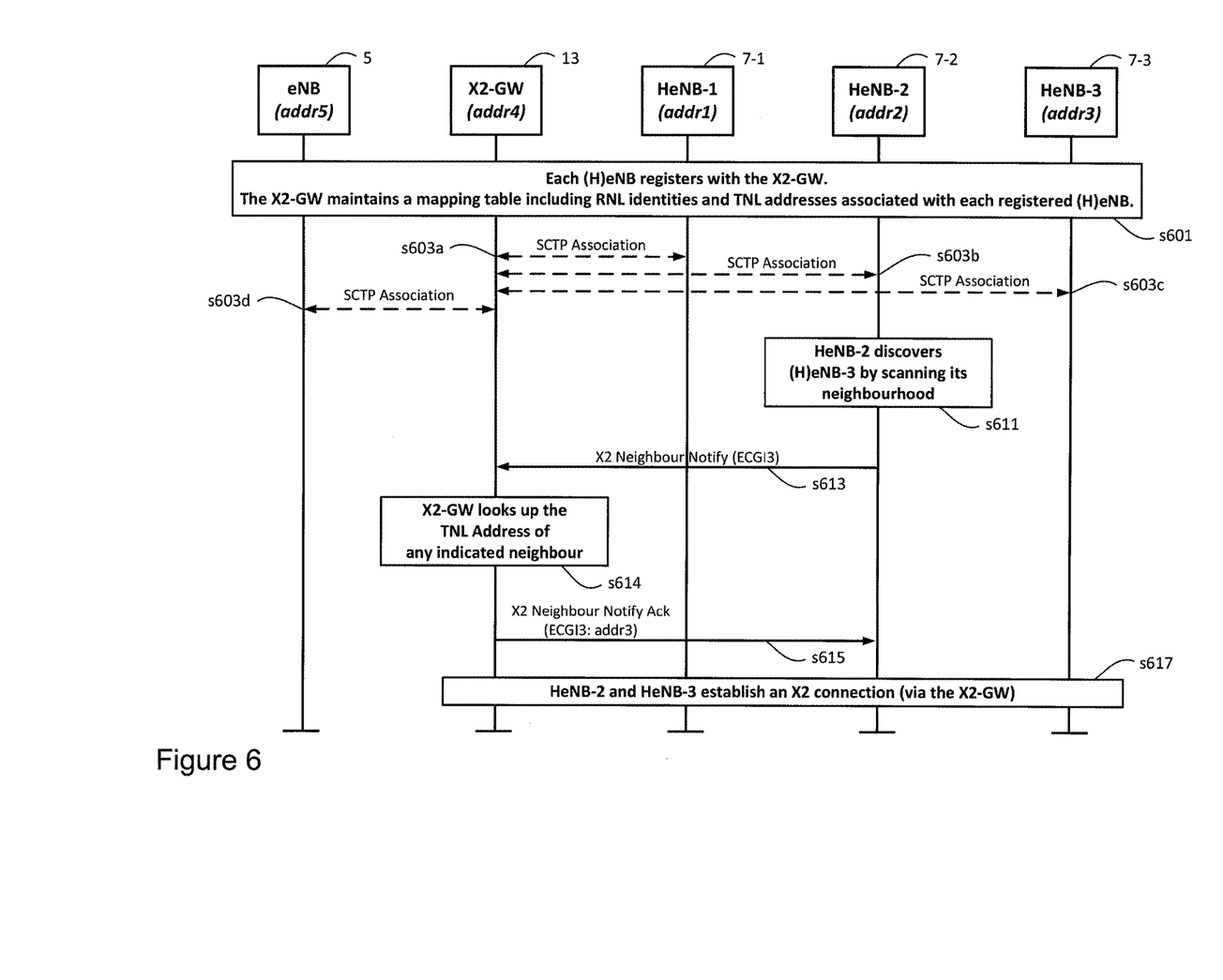
FIG. 6 is an exemplary timing diagram illustrating another method performed by components of the mobile telecommunication system of FIG. 1 whilst carrying out an embodiment of the invention.

FIG. 6 is an exemplary timing diagram illustrating another method performed by components of the mobile telecommunication system 1 of FIG. 1 whilst carrying out an embodiment of the invention. In this embodiment, which may be carried out subsequently to (and/or substantially in parallel to and/or instead of) the procedures described with reference to FIG. 5, the HeNB 7-2 discovering a neighbour cell is configured to use an 'X2 Neighbour Notify' message instead of a registration request.

In FIG. 6, step S601 generally corresponds to step S501 and S507 of FIG. 5. In this step each eNB 5 and HeNB 7 identifies its X2-GW 13 as soon as it powers on (or whenever its configuration changes) and registers with the X2-GW 13 (e.g. at X2-level, as described above with reference to steps S505 to S509), after having performed an appropriate SCTP association with the X2-GW 13. Therefore, the X2-GW is able to maintain a mapping table including relationship between respective RNL identities and TNL addresses for each registered (H)eNB. Steps S603a to S603d correspond to steps S503a to S503d, respectively, whilst step S611 corresponds to S511 and hence they will not be described in detail.

In this embodiment, the HeNB 7-2 discovering a neighbour cell needs to establish an X2 connection with the (H)eNB operating this cell. In order to do so, the second HeNB 7-2 generates and sends (using its X2-GW registration module 85 and transceiver circuitry 71) an appropriately formatted notification, e.g. an 'X2 Neighbour Notify' message, to indicate the discovered neighbour cell to the X2-GW 13 (step S613). The HeNB 7-2 includes in this message any neighbour cell ECGI that has been discovered by this HeNB 7-2—in this case 'ECGI3' which identifies a cell operated by HeNB 7-3.

As indicated generally at step S614, upon receipt of the neighbour notification from the second HeNB 7-2, the X2-GW 13 (using its HeNB registration module 145) looks up the TNL address associated with any indicated neighbour cell (as identified by the respective ECGI(s) in the received message). If an ECGI refers to a cell which has previously been included in the X2-GW's 13 mapping table (e.g. 'ECGI3' in step S507 or in S601), the X2-GW 13 retrieves the TNL address of the HeNB operating that cell.

In this case, as shown in step S615, the X2-GW 13 generates and sends (e.g. using its HeNB registration module 145 and transceiver circuitry 131) an appropriately formatted response, e.g. an 'X2 Neighbour Notify Ack' message, to confirm receipt of the notification at S613 and to provide the TNL address (i.e. 'addr3') associated with the HeNB 7-3 operating the discovered neighbour cell (i.e. 'ECGI3'). This message also confirms (either implicitly or explicitly, e.g. using an appropriate flag and/or information element) to the second HeNB 7-2 that the third HeNB 7-3 is also operating according to a compatible standard (e.g. Rel-12 or later).

Finally, as indicated generally at step S617, the second HeNB 7-2 and the third HeNB 7-3 are able to establish an X2 connection with each other using the TNL address 'addr3' (of HeNB 7-3) obtained from the X2-GW 13 (by HeNB 7-2) in the preceding step.

Although not indicated in FIGS. 5 and 6, if an associated TNL address cannot be found in its mapping table, the X2-GW 13 replies by indicating to the home base station that has discovered this neighbour that a corresponding TNL Address is not available. This message also informs (either implicitly or explicitly, e.g. using an appropriate flag and/or information element) the second HeNB 7-2 that the third HeNB 7-3 is not operating according to a compatible standard (e.g. it is operating according to an earlier than Rel-12 standard). Beneficially, such indication makes it possible for the base station to rely on conventional TNL discovery mechanisms (i.e. involving the MME 9) and/or to ignore that cell for future actions (e.g. not considering it for handover of the mobile telephone 3). It will also be appreciated that the reply provided by the X2-GW 13 may also include an indication whether the corresponding TNL Address for the HeNB 7-3 (operating the discovered neighbour cell) is to be used for setting up a direct X2 communication path or an indirect X2 communication path (i.e. via this X2-GW 13 or via a different X2 gateway) with that HeNB 7-3.

Embodiments of the invention provide robust TNL Address discovery methods with at least the following benefits:

Scalability: the proposed TNL Address Discovery of a peer node by (H)eNB is lightweight while reduces signalling traffic to the core network 9 (i.e. EPC);

Resilient: the proposed TNL Address Discovery is resilient to HeNBs frequent power on/off (either graceful for energy saving reasons or abrupt);

Backward compatibility: the proposed X2-GW does not require modifying any existing S1 messages (e.g. eNB/MME Configuration Transfer messages);

Situation-aware: the source (H)eNB is able to identify, without requiring any core network signalling, which X2-GW to use in order to reach a given target (in any X2-GW architecture), and to identify a mixed release situation, i.e. whether the target (H)eNB is operating according to pre-Rel-12, Rel-12, or other standards.

Modifications and Alternatives

A number of detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the above embodiments, (home) base stations and the X2 gateway are described as being addressed using their respective TNL addresses. As those skilled in the art will appreciate, other type of addresses may be used instead, e.g. an Internet Protocol (IP) address.

In the above description of step S513, the second HeNB 7-2 includes any ECGI associated with its cell(s) in a 'Source IE'. However, it will also be appreciated that if the second HeNB 7-2 has already registered its cell(s) with this X2-GW 13 before, the message sent at S513 is essentially a re-registration request which initiates a procedure for obtaining a TNL address of the new neighbour rather than a registration procedure. In this case therefore, the source ECGI(s) may be omitted.

In the above embodiments, a home base station is described to provide a notification (in S513 and/or S613) to a X2-GW upon discovery of another home base station. However, it will also be appreciated that either (or both) of the home base stations may be a macro base station.

If an eNB is connected to more than one X2-GWs, it will be appreciated that the eNB may notify each X2-GW about a newly discovered neighbour and receive the corresponding TNL Address from the X2-GW(s) which have that information.

The response to the neighbourhood indication (at step S515 or S615) may also be used to indicate to a source (H)eNB whether the target (H)eNB is operating according to pre-Rel-12 standards or not. In this case, the X2-GW 13 may also include an (explicit or implicit) indication of the discovered neighbour's capabilities in addition to its TNL address.

In a similar manner, it is also possible to indicate whether the target (H)eNB is to be accessed without involving the X2-GW 13 or using a different X2-GW configuration.

Based on the above indications, the source (H)eNB is able to select a direct X2 connection (after a TNL discovery) in a conventional way (this option is applicable to pre-Rel-12 (H)eNB and/or HeNB without X2-GW or with different X2-GW configuration). The source (H)eNB may also consider using S1 Setup procedures as a fall-back option.

Furthermore, it will also be appreciated that the source (H)eNB may select whether to establish i) an X2 connection through the X2-GW 13 or ii) a direct (end-to-end) X2 connection following an end-to-end SCTP association with the target (H)eNB.

In the above embodiments, each base station registers with a single X2 gateway. However, it will also be appreciated that a base station, e.g. a macro base station in particular, may register with more than one gateway. In this case, upon discovery of a neighbour base station cell, the base station may provide an indication of the neighbour to any X2 gateways (one or more, possibly all X2 gateways) it has registered with. The base station may subsequently set up an X2 connection with its neighbour base station via the X2 gateway that provides the TNL address for the neighbour base station (i.e. unless it is indicated by that X2 gateway that a direct X2 connection or an X2 connection via another X2 gateway is to be set up).

It will also be appreciated that if a (H)eNB is powered off, its associated entry in the mapping table is to be deactivated as well. This may be carried out by the (H)eNB sending an appropriately formatted de-registration request (i.e. in a similar manner as the initial registration in steps S505 to S509 described above) and the X2-GW 13 updating its mapping table in dependence of the information included in the de-registration request. The actual message used for de-registration may be, for example, an 'X2 De-registration Request' indicating the ECGI(s) to be de-registered. It will also be appreciated that the same message as for registration, i.e. an 'X2 Registration Request' may also be used to indicate de-registration, in this case an empty source field may indicate that any previously registered cells for the sender (H)eNB is to be removed from the mapping table maintained in the X2-GW 13. Finally, any cell may be deactivated/removed from the mapping table automatically, e.g. upon expiry of a timer (either a default timer or a timer defined in the corresponding registration request by the (H)eNB).

It will also be appreciated that in case of an unsuccessful X2 registration (e.g. due to communication problems, lack of authorisation, overload situation, etc.), the X2-GW 13 may return (in step S509 or S515) a negative confirmation (e.g. an 'X2 Registration Request Nack' message) to the (H)eNB requesting registration. Similarly, a negative confirmation may also be given (in step S615) for any 'X2 Neighbour Notify' message that the X2-GW 13 is unable to handle for any reason. Such negative confirmation may cause the (H)eNB to re-send the failed registration/neighbour notification message, e.g. after a predefined period has elapsed.

It will be appreciated that an X2 communication link between two (home) base stations may be set up either on an end-to-end or a hob-by-hop basis. In either case however, if X2 signalling is routed via an X2-GW, it is carried out between the two (home) base stations on top of two disjoint SCTP communication links (i.e. using a respective SCTP association between the X2-GW and both base stations).

In the embodiments described above, the base station and the home base station each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HENB or to the mobile telephone as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

This application is based upon and claims the benefit of priority from United Kingdom patent application No. 1306203.9, filed on Apr. 5, 2013, the disclosure of which is incorporated herein in its entirety by reference.

The invention claimed is:

1. A system comprising an X2 gateway apparatus, a plurality of base stations, and a mobile device operable to communicate with at least one of the plurality of base stations, wherein:

the X2 gateway apparatus comprises a memory storing instructions and one or more processors configured to execute the instructions to:
maintain, for each base station connected to the X2 gateway apparatus, respective association information indicating a mapping of an identifier for that base station to at least one Transport Network Layer (TNL) address for that base station;

at least one base station of the plurality of base stations comprises a memory storing instructions and one or more processors configured to execute the instructions to:
register with the X2 gateway apparatus wherein said registering comprises sending, to the X2 gateway apparatus after a Stream Control Transmission Protocol (SCTP) association has been established, a message to initiate registration with the X2 gateway apparatus, the message comprising the identifier for the at least one base station, wherein the identifier comprises an information element based on an E-UTRAN Cell Global Identifier (ECGI) of the at least one base station; and wherein the processor of the X2 gateway apparatus further:
receives, from the at least one base station, said message; and
updates the association information, based on information included in the message, to reflect a mapping to at least one TNL address of the base station from which the message originated.

2. The communication system according to claim 1, wherein the at least one base station comprises a macro base station or a home base station operating in accordance with Long Term Evolution (LTE) standards.

3. An X2 gateway apparatus in a communication system comprising a plurality of base stations, the X2 gateway apparatus comprising:

a memory storing instructions and one or more processors configured to execute the instructions to:
maintain, for each base station connected to the X2 gateway apparatus, respective association information indicating a mapping of an identifier for that base station to at least one Transport Network Layer (TNL) address for that base station;
receive, from at least one base station after a Stream Control Transmission Protocol (SCTP) association has been established, a message to initiate registration with the X2 gateway apparatus, the message comprising the identifier for the at least one base station, wherein the identifier comprises an information element based on an E-UTRAN Cell Global Identifier (ECGI) of the at least one base station; and
update the association information, based on information included in the message, to reflect a mapping to at least one TNL address of the base station from which the message originated.

4. The X2 gateway apparatus according to claim 3, wherein the one or more processors further create the association information with at least one of the plurality of base stations using a first communication protocol.

5. The X2 gateway apparatus according to any of claim 3, wherein the one or more processors further register the at least one base station using a second communication protocol over a first communication protocol.

6. The X2 gateway apparatus according to claim 5, wherein the first communication protocol is an SCTP and the second communication protocol is an X2 protocol.

7. The X2 gateway apparatus according to claim 3, wherein the one or more processors further receive, from the at least one base station at least one message.

8. The X2 gateway apparatus according to claim 7, wherein the at least one message comprises a registration request or a neighbourhood notification message.

9. The X2 gateway apparatus according to claim 3, wherein the identifier comprises an E-UTRAN Cell Global Identifier (ECGI).

10. The X2 gateway apparatus according to claim 3, wherein the one or more processors further maintain the association information.

11. A base station for use in a communication system comprising a plurality of base stations and an X2 gateway apparatus, the base station comprising:
a memory storing instructions and one or more processors configured to execute the instructions to:
obtain an identifier for the base station, wherein the identifier comprises an information element based on an E-UTRAN Cell Global Identifier (ECGI) of the base station;
register with the X2 gateway apparatus wherein said registering comprises sending, to the X2 gateway apparatus after a Stream Control Transmission Protocol (SCTP) association has been established, a message to initiate registration with the X2 gateway apparatus, the message comprising the identifier for the base station.

12. The base station according to claim 11, wherein the processor further establishes a connection with another base station without contacting a core network.

13. The base station according to claim 11, wherein the processor further sends the X2 gateway apparatus at least one message.

14. The base station according to claim 13, wherein the at least one message comprises a registration request or a neighbourhood notification message.

15. The base station according to claim 11, wherein the identifier comprises an E-UTRAN Cell Global Identifier (ECGI).

16. The base station according to claim 11, wherein the processor further creates an association information with the X2 gateway apparatus using a first communication protocol.

17. The base station according to claim 11, wherein the processor further registers the base station with the X2 gateway apparatus using a second communication protocol over a first communication protocol.

18. The base station according to claim 17, wherein the processor further registers the base station with a plurality of X2 gateway apparatuses.

19. The base station according to claim 18, wherein the processor further provides the identifier to the plurality of X2 gateway apparatuses.

20. The base station according to claim 17, wherein the first communication protocol is an SCTP and the second communication protocol is an X2 protocol.

21. The base station according to claim 17, wherein the processor further provides to the X2 gateway apparatus a Radio Network Layer (RNL) identity of the base station and a Transport Network Layer (TNL) address of the base station.

22. The base station according to claim 11 comprising a macro base station or a home base station operating in accordance with Long Term Evolution (LTE) standards.

23. A method performed by an X2 gateway apparatus, the method comprising:
maintaining, for each base station connected to the X2 gateway apparatus, respective association information indicating a mapping of an identifier for that base station to at least one Transport Network Layer (TNL) address for that base station;
receiving, from at least one base station after a Stream Control Transmission Protocol (SCTP) association has been established, a message to initiate registration with the X2 gateway apparatus, the message comprising the identifier for the at least one base station, wherein the identifier comprises an information element based on an E-UTRAN Cell Global Identifier (ECGI) of the at least one base station; and
updating the association information, based on information included in the message, to reflect a mapping to at least one TNL address of the base station from which the message originated.

24. A method performed by a base station in a communication system comprising a plurality of base stations and an X2 gateway apparatus, the method comprising:
obtaining an identifier for the base station, wherein the identifier comprises an information element based on an E-UTRAN Cell Global Identifier (ECGI) of the at least one base station;
registering with the X2 gateway apparatus wherein said registering comprises sending, to the X2 gateway apparatus after a Stream Control Transmission Protocol (SCTP) association has been established, a message to initiate registration with the X2 gateway apparatus, the message comprising the identifier for the base station.

25. A non-transitory computer-readable medium comprising computer-readable instructions for causing a programmable communications device to perform a method comprising:
maintaining, for each base station to an X2 gateway apparatus, respective association information indicating a mapping of an identifier for that base station to at least one Transport Network Layer (TNL) address for that base station;
receiving, from at least one base station after a Stream Control Transmission Protocol (SCTP) association has been established, a message to initiate registration with the X2 gateway apparatus, the message comprising the identifier for the at least one base station, wherein the identifier comprises an information element based on an E-UTRAN Cell Global Identifier (ECGI) of the at least one base station; and updating the association information, based on information included in the message, to reflect a mapping to at least one TNL address of the base station from which the message originated.

26. A non-transitory computer-readable medium comprising computer-readable instructions for causing a programmable communications device to perform a method comprising:

obtaining an identifier for the base station, wherein the identifier comprises an information element based on an E-UTRAN Cell Global Identifier (ECGI) of the at least one base station;

registering with an X2 gateway apparatus wherein said registering comprises sending, to the X2 gateway apparatus after a Stream Control Transmission Protocol (SCTP) association has been established, a message to initiate registration with the X2 gateway apparatus, the message comprising the identifier for the base station.

* * * * *